(12) United States Patent
Mecheri et al.

(10) Patent No.: US 12,555,262 B2
(45) Date of Patent: Feb. 17, 2026

(54) METHOD AND SYSTEM FOR HAZARDOUS ITEM DETECTION

(71) Applicant: BinIt Inc., Norwalk, CT (US)

(72) Inventors: Raghav Mecheri, New York, NY (US); James Benjamin Bollas, New York, NY (US)

(73) Assignee: BinIt Inc., Norwalk, CT (US)

( * ) Notice: Subject to any disclaimer, the term of this patent is extended or adjusted under 35 U.S.C. 154(b) by 337 days.

(21) Appl. No.: 18/198,274

(22) Filed: May 16, 2023

(65) Prior Publication Data

US 2024/0281994 A1 Aug. 22, 2024

Related U.S. Application Data

(60) Provisional application No. 63/486,041, filed on Feb. 20, 2023.

(51) Int. Cl.
*G06T 7/70* (2017.01)
*G06T 7/20* (2017.01)
(Continued)

(52) U.S. Cl.
CPC .................. *G06T 7/70* (2017.01); *G06T 7/20* (2013.01); *G06V 10/44* (2022.01); *G06V 10/761* (2022.01); *G06V 20/70* (2022.01); *G08B 21/00* (2013.01)

(58) Field of Classification Search
CPC ... G06T 7/70; G06T 7/20; G06T 2207/10116; G06T 2207/20084; G06T 7/73;
(Continued)

(56) References Cited

U.S. PATENT DOCUMENTS

| 2018/0128936 A1 | 5/2018 | Franco et al. |
| 2019/0130560 A1 | 5/2019 | Horowitz et al. |
| (Continued) | | |

FOREIGN PATENT DOCUMENTS

| CN | 1759038 | * 4/2006 | ............ B65B 19/30 |
| CN | 212049553 | * 12/2020 | |
| CN | 114115296 | * 5/2022 | ........... G05D 1/0225 |

OTHER PUBLICATIONS https://qz.com/1371531/deep-learning-algorithms-are-being-used-to-detect-lithium-ion-batteries-in-airport-luggage.
(Continued)

*Primary Examiner* — Jerome Grant, II
(74) *Attorney, Agent, or Firm* — Redbrick IP, P.C.

(57) ABSTRACT

A system and method for detecting hazardous items in a recycling facility, including: receiving, from a first non-visible spectrum image capturing device, a first non-visible spectrum image of items on a conveyor belt. The system and method may include providing, to an AI module, the first non-visible spectrum image of the items on the conveyor belt, where the AI module includes functionality to identify features of the items captured in the first non-visible spectrum image; compare the identified features of the items on the conveyor belt to features of hazardous items of the AI module; and identify a hazardous item in the first non-visible spectrum image based on a similarity between the identified features to the features of hazardous items of the AI module. The system and method may include providing, in response to identifying the hazardous item, an indication of the presence of the hazardous item.

20 Claims, 6 Drawing Sheets

(51) Int. Cl.
*G06V 10/44* (2022.01)
*G06V 10/74* (2022.01)
*G06V 20/70* (2022.01)
*G08B 21/00* (2006.01)

(58) Field of Classification Search
CPC ...... G06V 10/44; G06V 10/761; G06V 20/70; G06V 10/143; G06V 20/52; G08B 21/00; G08B 21/02
USPC .......................................................... 382/103
See application file for complete search history.

(56) References Cited

U.S. PATENT DOCUMENTS

| | | |
|---|---|---|
| 2019/0235511 A1 | 8/2019 | Tiwari et al. |
| 2019/0344448 A1 | 11/2019 | Wicks et al. |
| 2023/0023641 A1 | 1/2023 | Rosenfeld et al. |
| 2023/0386199 A1* | 11/2023 | Klein ................... G06Q 10/04 |

OTHER PUBLICATIONS https://www.vice.com/en/article/xgdvpk/lithium-battery-fires-are-threatening-recycling-as-we-know-it.
https://www.recycling-magazine.com/2022/11/28/new-eu-funded-project-aims-to-prevent-fires-caused-by-batteries-at-e-waste-recycling-facilities/.
https://www.tomra.com/en/food/machines/tomra-5x.
https://www.tomra.com/en/waste-metal-recycling/products/machines/new-x-tract.
https://www.tomra.com/en/waste-metal-recycling/products/machines/x-tract.
https://www.nrel.gov/transportation/x-ray-diagnostics.html.
WeSort AI—Abfallanalyse und Sortierung auf e in em n euen Level, https://www.wesort.ai/?lang=en, accessed, May 29, 2024.
About—GRINNER, https://grinnerproject.eu/about/, accessed Apr. 25, 2024.

* cited by examiner

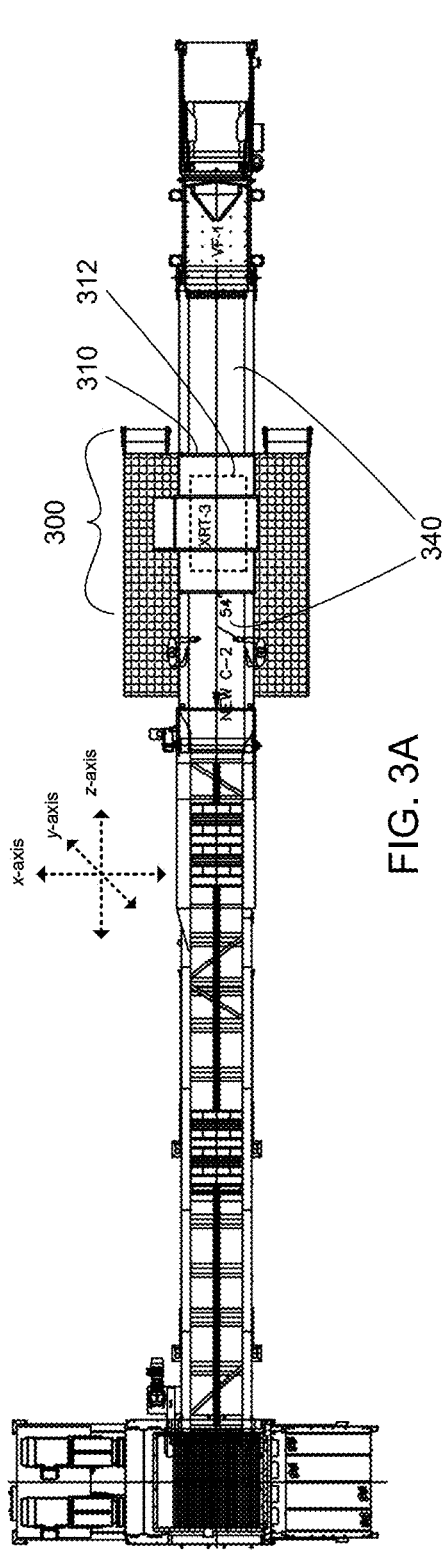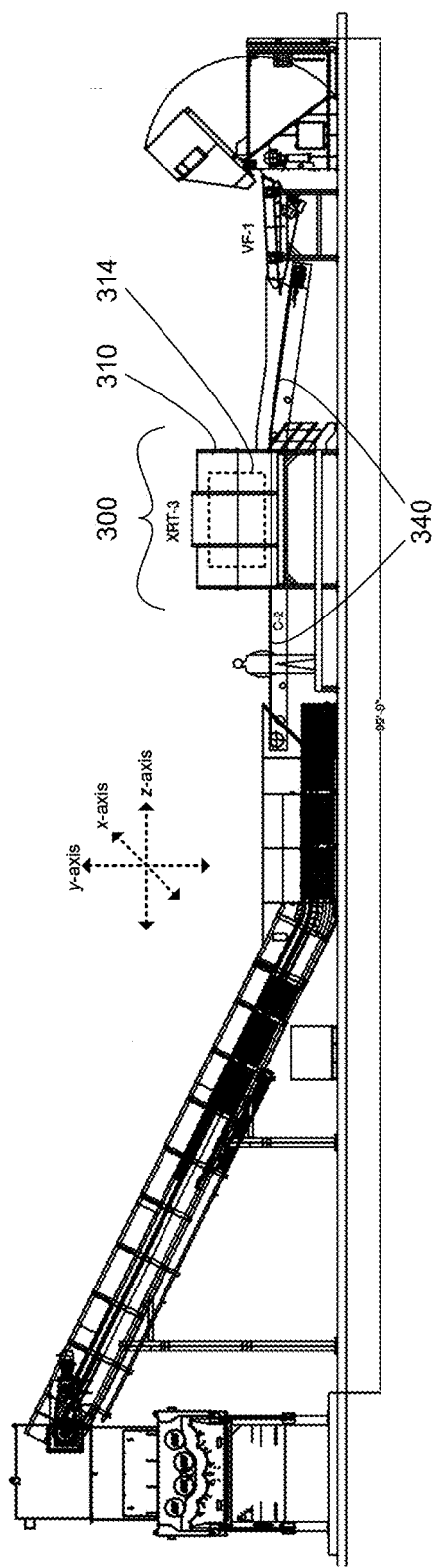
FIG. 3A
FIG. 3B

METHOD AND SYSTEM FOR HAZARDOUS ITEM DETECTION

CROSS-REFERENCE TO RELATED APPLICATIONS

This application claims the benefit of U.S. Provisional Patent Application Ser. No. 63/486,041, entitled "METHOD AND SYSTEM FOR HAZARDOUS ITEM DETECTION", filed Feb. 20, 2023, the entire disclosure of which is incorporated by reference herein, in its entirety, for all purposes.

BACKGROUND

Many types of hazardous items pose a risk for a variety of environments. For example, propane tanks, batteries (e.g., Lithium-Ion or Lead-Acid), printer ink cartridges, printer toner cartridges, and other various other hazardous items (including flammable and/or combustible and/or volatile items) enter transport vehicles carrying recycling materials bound for material transfer stations and recycling facilities. These hazardous items can cause explosions, fires, damage to infrastructure, damage to the equipment, injury or even death to personnel. Further, such events can impact the operations, efficiency, efficacy, and/or viability of such facilities. Accordingly, many environments like materials recycling facilities (MRF), construction and demolition (C&D) recycling facilities, e-waste recycling facilities, waste-to-energy facilities, medical waste facilities, and other similar shredder facilities are affected, meanwhile they have almost no solutions for this issue.

In fact, it is not uncommon that a facility experiences up to 50 fires per year. A majority of facilities require in excess of $20 million in capital expenditure to set up, and hazardous items expose these facilities to considerable loss. The employees at these facilities are also put at risk of extreme injury or death. Further, insurance premiums may spike in response to fire-related events, with insurance premiums increasing 30% year-over-year over the last five years.

The below excerpt from Vice's coverage of the MRF battery problem (https://www.vice.com/en/article/xgdvpk/lithium-battery-fires-are-threatening-recycling-as-we-know-it) says a lot: "Every (Materials Recycling Facility) MRF, pretty much, in California is experiencing fires, if not on a daily basis, on a weekly basis," Kobold said. "We're on the fringe of losing our recycling infrastructure that we've built over several decades to try and recycle this stuff."

MRF operators consistently state that: (1) Li-Ion batteries are a massive safety issue, and (2) Li-Ion batteries and the fires that result at MRFs are an unsolved problem.

Existing technology solutions struggle with identifying certain hazardous items. For example, small hazardous items like Li-Ion batteries, when they are buried underneath other waste (aka "burden depth", which increases with the amount and/or density and/or intricacy of other blocking waste). Li-Ion batteries can be hidden within devices, for example, inside of drones. Ink/toner cartridges can be within electronic devices as well. Such items may not be visible to the naked eye nor conventional cameras. Removal of these items is a near-impossible and expensive process with existing automation solutions.

Fires can be of various types, for example, on a tip floor or within a conveyor line. A tip-floor fire is typically caused by an automotive vehicle running over a live battery, while conveyor line fires are caused by overheated batteries as they're processed through the facility.

SUMMARY

In general, in one aspect, embodiments relate to a system for detecting hazardous items in a recycling facility. The system can include a vision system configured to capture images of items on a conveyor belt. The vision system can include a body operable to be positioned with respect to the conveyor belt. The vision system can further include a first non-visible spectrum image capturing device coupled with the body, where the first non-visible spectrum image capturing device is operable to capture non-visible spectrum images of the items on the conveyor belt. The vision system can include a control unit executing on a computer processor and configured to receive, from the vision system, a first non-visible spectrum image of items on the conveyor belt. The control unit can provide, to an AI module, the first non-visible spectrum image of the items on the conveyor belt, where the AI module includes functionality to identify features of the items captured in the first non-visible spectrum image; compare the identified features of the items on the conveyor belt to features of hazardous items of the AI module; and identify a hazardous item in the first non-visible spectrum image based on a similarity between the identified features to the features of hazardous items of the AI module. The control unit can provide, in response to identifying the hazardous item, an indication of the presence of the hazardous item.

In general, in one aspect, embodiments relate to a method for detecting hazardous items in a recycling facility. The method can include: receiving, from a first non-visible spectrum image capturing device, a first non-visible spectrum image of items on a conveyor belt. The method can further include providing, to an AI module, the first non-visible spectrum image of the items on the conveyor belt, where the AI module includes functionality to identify features of the items captured in the first non-visible spectrum image; compare the identified features of the items on the conveyor belt to features of hazardous items of the AI module; and identify a hazardous item in the first non-visible spectrum image based on a similarity between the identified features to the features of hazardous items of the AI module. The method can further include providing, in response to identifying the hazardous item, an indication of the presence of the hazardous item.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

FIGS. 3A-3B show examples of alternate depictions of at least a portion of a hazardous item detection system in accordance with one or more embodiments.

DETAILED DESCRIPTION

Figure 1:
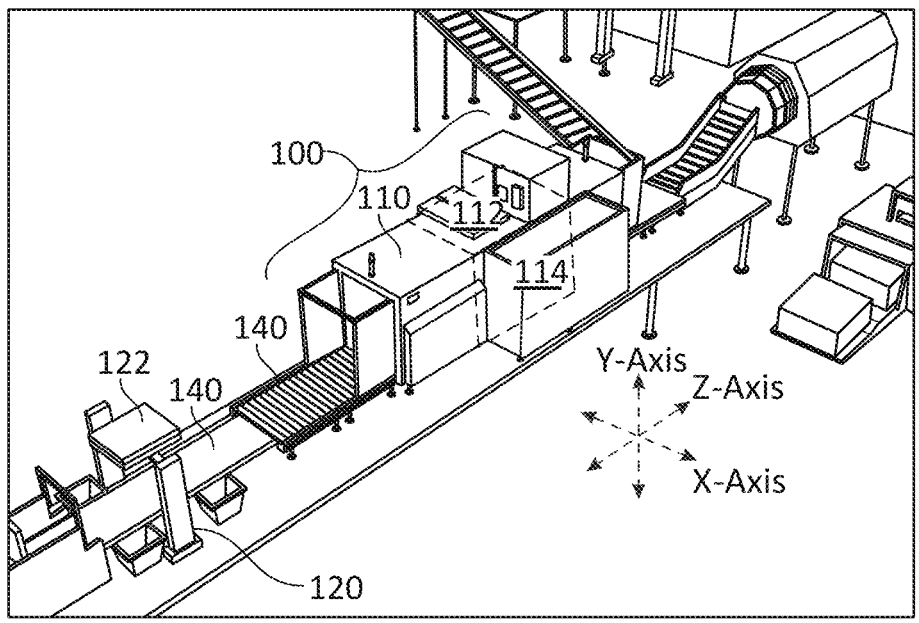
FIG. 1 shows an example depiction of at least a portion of a hazardous item detection system in accordance with one or more embodiments.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide methods and systems for detecting hazardous items (e.g., in a recycling facility or otherwise). Embodiments of the present invention are directed to preventing such aforementioned problems. For example, such hazardous items may be detected as they enter facilities or particular environments, not as they exit. For example, detected on a conveyor belt prior to being placed on a tip floor or as they pass through in-bound material & pre-sort conveyor lines.

Embodiments of the present invention can include an automated hazard detection system paired with a user-friendly human feedback loop. The system may use various imaging technologies (e.g., non-visible spectrum scanning) and/or deep learning. As a result, hazardous items present on a conveyor belt at a recycling facility may be automatically detected and nearby or remote personnel may be notified accordingly. Further, a comprehensive analysis of the incoming material into a recycling facility may be performed to provide users with insights regarding material quality.

Embodiments may utilize imaging technologies such as X-ray imaging, computed tomography (CT scan) imaging, dual-energy X-ray absorptiometry (DEXA) imaging, millimeter wave (MM-wave) imaging, light detection and ranging (LIDAR), and/or other imaging technologies to detect hazardous items. For example, batteries or ink/toner cartridges may be embedded inside a containing device, therefore hidden from plain sight. This problem is compounded when the containing device may be further hidden from view by being situated under or next to other visually-blocking items. However, the imaging technology may detect the batteries or ink/toner cartridges through the visually blocking materials.

Embodiments may include imaging technologies in multiple planes. For example, a first X-ray device may scan from a top position while a second X-ray device may scan from a lateral position, thereby achieving imagery in the zy-plane and the zx-plane (where a conveyor belt moves in the z-axis direction), respectively. Accordingly, if a cylindrically shaped battery is "standing up", the first X-ray device scanning from above may only capture a circle shape, but the second X-ray device scanning from the side would capture the length of the battery shape. Further, regardless of the position of hazardous items, multiple imaging devices may achieve a 2D or 3D image of the items, improving the confidence level of object detection.

Embodiments may include additional imaging devices with artificial intelligence/machine learning/deep learning capabilities. In one example, the system may detect and point toward a hazardous material, then relying on a secondary device to track and verify the hazardous item's removal. The system may then also trigger secondary safety workflows if the hazardous item is detected as still present. In another example, the system may learn that particular shapes and/or sizes of objects correspond to particular types of hazardous items (e.g., particular Li-Ion batteries), and in response to detecting objects matching those dimensions, may flag such objects.

In yet another example, the system may learn that objects with particular characteristics correspond with hazardous materials (e.g., Li-Ion batteries often include particular wiring and/or mounting patterns), and in response to detecting objects matching such characteristics, may flag such objects.

In a further example, the system learns from which sources or which types of sources include more hazardous items and/or what types of hazardous items. In an additional example, the system learns which geographic regions have more and which types of hazardous items than others.

In another example, the system may learn that particular makes and/or models of objects correspond to hazardous materials, and in response to detecting objects matching those makes and/or models, may flag such objects.

Embodiments may utilize X-Ray detection to prevent conveyor line fires. The detection may result in various actionable hazardous item removal workflows. In a conveyor scenario, all of the material passes through a conveyor line at some point, and this allows the system to leverage existing recycling infrastructure to address this problem.

Embodiments may utilize physical and mechanical augmentations like mechanical screens, shaker screens, or robotics prior to imaging to manipulate inbound items into positions more favorable for imaging. For example, the augmentation(s) may manipulate one or more items such that they are more distributed/separated rather than "piled" or to reduce burden depth. In another example, a first imaging attempt may be determined to be inconclusive because it fails to meet a confidence threshold (e.g., as decided by staff personnel, AI, or otherwise). In response, the augmentation(s) may manipulate one or more items such that they are repositioned for a next imaging attempt (e.g., such that the items are rotated to other angles, such that they are situated differently with respect to other items, etc.). In another example, a mechanical screen may be utilized to remove large quantities of cardboard material, optionally following manual inspection but prior to scanning, to improve system performance.

Embodiments of the present invention can include X-ray detection for pre-sorting of materials. One or more embodiments may include (1) Accurate and automated detection of hazardous items, regardless of burden depth; (2) Recording of every avoided incident tracked and stored in a computer network; and/or (3) Use of laser & monitor to help presort find & remove items. An optical sorter or a visual-spectrum (RGB) camera sensor may also be used.

Embodiments may include a modular X-Ray and/or laser-pointer system that can be installed on an infeed/presort conveyor. Specific locations of detected hazardous items may be pinpointed, enabling a manual sort worker or mechanical device (e.g., a robot) to dig through the burden depth & recover the item.

Embodiments may include a modular X-Ray and/or conveyor line diversion system. Specific regions of a conveyor belt may be pinpointed as containing hazardous material and then diverted, enabling near-automated removal of hazardous items.

Embodiments may include a non-visible-spectrum based scanning system responsible for generating images of items (e.g., items present on the conveyor belt at a recycling facility). The system may include a control unit/system responsible for processing these images via artificial intelligence (e.g., machine learning, deep learning, neural networks, or a combination thereof). The system may include a customized notification mechanism responsible for alerting responsible parties on-site that a hazardous item has been spotted on their conveyor line.

Embodiments may include a customized notification mechanism allowing users to set up response workflows to hazardous items based on whatever approach suits them best. Be it an e-stop of a conveyor belt, setting up a laser pointer to pinpoint the item, installing a television screen or setting up alerts by text message, the system can cover it all. Based on a predetermined or AI-learned/learning severity level of each hazardous item detail, different actions may be taken depending on severity level. For example, slowing the conveyor belt versus a complete stop.

AI System

Embodiments may include Computer Vision algorithms being run in real-time, remotely, or on-site at a recycling facility. Unlike prior efforts in this space, the system may rely on optimized and lightweight deep learning algorithms running on edge-computing devices at facilities. This could eliminate the requirement to train and deploy deep learning models on the cloud (network of computer systems, e.g., communicatively coupled via the Internet), allowing for low-latency and near real-time hazardous item detection.

User Notifications

Embodiments may include enforcing User Notifications by multiple options. These include, but are not limited to, a visual interface (e.g., a monitor, screen, etc.) or a physical interface (e.g., a laser pointer). The system may include integration with a downstream or external sorting system (like optical sorters, sorting mechanical devices (e.g., robots), and/or a conveyor line diversion system) in order to remove the hazard.

Using a Monitor/Screen

Embodiments may include a visual mode of notification like a monitor or screen, which could result in more information rich data. This would allow education of presort pickers/workers not only in the xz-plane position of a hazardous item (e.g., its position on a conveyor belt), but also on the y-axis position (e.g., its vertical position). For example, a simple user interface hosted on a local server that renders an image and some additional data when an item is detected.

Using a Laser

Embodiments may include a programmable 3-axis robotic laser pointer operable to physically point out the location of hazardous items.

Integration with a Diversion Conveyor Line

Embodiments may include a programmable conveyor line, capable of changing the direction of material flow to physically divert sections of waste marked as containing contamination.

Integration with External Sorting Systems

The system may include integration with external mechanical or robotic systems, thereby instructing and allowing the mechanical or robotic systems to recover the detected hazardous items.

Tracking and Analytics

Embodiments include tracking hazardous item incidents/encounters. Embodiments may further include analytics about the tracked hazardous item incidents/encounters. For example, the system may track when and what types of hazardous items are encountered.

"Lithium battery fires=Existential Threat to Recycling"—Shoreway Environmental Center, CA (source: Vice Media).

FIG. 1 shows an example depiction of at least a portion of a hazardous item detection system 100 in accordance with one or more embodiments. At least a portion of the hazardous item detection system 100 may be positioned proximate to a conveyor belt 140, such that the hazardous item detection system 100 may capture images of items on the conveyor belt 140.

In one or more embodiments, the hazardous item detection system 100 includes a vision system 220 that may capture images of items on the conveyor belt 140. The vision system 220 may include a body 110 positioned proximate to the conveyor belt 140. For example, the body 110 may be positioned on top of, around, or over the conveyor belt 140.

In some embodiments, the body 110 is a housing with openings on two ends to allow passage of items on the conveyor belt 140. It should be understood that other positions and/or structures for the body 110 are possible. For example, the body 110 may be a single arm extending over or laterally with respect to the conveyor belt 140, or double arm mount structure at least partially, or completely (e.g., like that shown by a body 120), encircling the conveyor belt 140. In another example, the body 110 may be a pendant structure hanging from a ceiling or other structure above the conveyor belt 140 (not shown).

The vision system 220 may include one or more image capturing devices. In some embodiments, the image capturing devices may be coupled with the body 110. Further, the image capturing devices may be visible and/or non-visible spectrum image capturing devices. For example, vision system 220 may include a non-visible spectrum image capturing device 112 and/or 114 (depicted with dashed lines because they may be located inside of the body 110). The non-visible spectrum image capturing devices 112 and/or 114 may include functionality to capture non-visible spectrum images of the items on the conveyor belt 140. For example, a non-visible spectrum image capturing device may be X-ray imaging device, a computed tomography (CT scan) imaging device, a dual-energy X-ray absorptiometry (DEXA) imaging device, a millimeter wave (MM-wave) imaging device, a light detection and ranging (LIDAR) imagining device, or an infrared imaging device (e.g., optionally with a pre-heating element to create a specific heat/heat capacity gradient across different surfaces).

In some embodiments, the non-visible spectrum image capturing devices may be positioned with different perspectives from one another, so as to capture different perspectives of the items on the conveyor belt 140. For example, the non-visible spectrum image capturing device 112 may capture images from a top view (e.g., in the y-axis direction resulting in a z-axis by x-axis image) whereas the non-visible spectrum image capturing device 114 may capture images from a side view (e.g., in the x-axis direction resulting in a z-axis by y-axis image). In one example, if the non-visible spectrum image capturing devices 112 and 114 are x-ray imaging devices, the x-ray generator and detector primarily for the non-visible spectrum image capturing device 112 occupy/extend across the zx-plane, whereas the x-ray generator and detector primarily for the non-visible spectrum image capturing device 114 occupy/extend across the zy-plane. Please note that in FIG. 1, the z- and x-axes extend partially into/out of the page at a perspective angle.

In some embodiments, vision system 220 may include one or more visible spectrum image capturing devices located inside of the body 110, outside of the body 110 and operable to capture images of items entering the system 100/body 110, and/or outside of the body 110 and operable to capture images of items exiting the system 100/body 110. In some embodiments, visible spectrum image capturing devices located outside of the body 110 are coupled with the body 110 (e.g., mounted on the body), not coupled with the body 110 (e.g., mounted on other structures), or a combination thereof.

It should be understood that other positions for the image capturing device(s) are possible. For example, a non-visible spectrum image capturing device 122 may be coupled with the body 120 (described herein). In another example, a non-visible spectrum image capturing device may be coupled with a pendant structure (described herein). Visible spectrum image capturing devices may also be coupled with such structures.

FIGS. 3A-3B show examples of alternate depictions of at least a portion of a hazardous item detection system in accordance with one or more embodiments. For example, a hazardous item detection system 300, a conveyor belt 340, a non-visible spectrum image capturing device 312, and/or a non-visible spectrum image capturing device 314, may be the same as or similar to the hazardous item detection system 100, the conveyor belt 140, the non-visible spectrum image capturing device 112, and/or the non-visible spectrum image capturing device 114, respectively. Please note that in FIG. 3A, the y-axis extends into/out of the page (orthogonal to the page's plane), and that in FIG. 3B, the x-axis extends into/out of the page (orthogonal to the page's plane). As illustrated, the non-visible spectrum image capturing device 312 (FIG. 3A) may capture images from a top view (e.g., in the y-axis direction resulting in a z-axis by x-axis image) whereas the non-visible spectrum image capturing device 314 (FIG. 3B) may capture images from a side view (e.g., in the x-axis direction resulting in a z-axis by y-axis image). In one example, if the non-visible spectrum image capturing devices 312 and 314 are x-ray imaging devices, the x-ray generator and detector primarily for the non-visible spectrum image capturing device 312 occupy/extend across the zx-plane, whereas the x-ray generator and detector primarily for the non-visible spectrum image capturing device 314 occupy/extend across the zy-plane.

Figure 2:
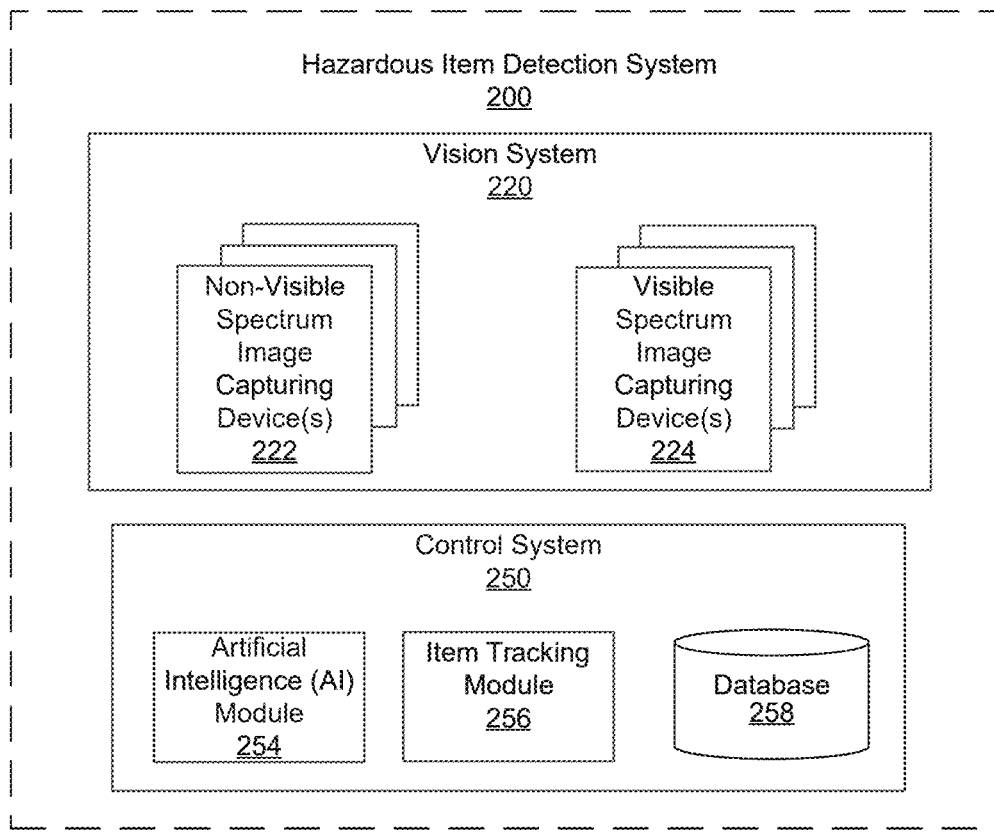
FIG. 2 shows an example depiction of at least a portion of a hazardous item detection system in accordance with one or more embodiments.

Returning to FIG. 2, in one or more embodiments, the hazardous item detection system 100 includes a control system 250 (e.g., executing on a computer processor). The control system 250 may include functionality to receive, from the vision system 220, a non-visible spectrum image of the items on the conveyor belt 140 (e.g., any of the images 410, 420, 430, 440 but without the hazardous waste labels). For example, the non-visible spectrum image may have been captured by the non-visible spectrum image capturing devices 112, 114, 122, or any other device not shown. It should be appreciated that while various embodiments are discussed with respect to a single image, multiple images are also possible. For example, multiple images from a single image capturing device (e.g., only the non-visible spectrum image capturing device 112), from multiple non-visible spectrum image capturing devices (e.g., the non-visible spectrum image capturing device 112 and 114), and/or a combination of visible and non-visible spectrum image capturing devices.

In some embodiments, the control system 250 may include functionality to also receive, from the vision system 220, a visible spectrum image of the items on the conveyor belt 140. In various embodiments, the control system 250 may include functionality to use visible spectrum images in the same or similar analysis as that of the non-visible spectrum images, to determine if non-visible spectrum images should even be captured for particular items, to determine if captured non-visible spectrum images should be analyzed, to determine whether items should be manipulated for more favorable imaging, to confirm whether hazardous items were removed, to provide a more human-friendly image, and other uses.

In one or more embodiments, the control system 250 may include functionality to provide, to an artificial intelligence (AI) module 254, the non-visible spectrum image of the items on the conveyor belt. In some embodiments, the control system 250 may include functionality to also provide, to the AI module 254, the visible spectrum image of the items on the conveyor belt. It should be appreciated that the AI module 254 may implement machine learning, deep learning, neural networks, or a combination thereof.

Figure 4:
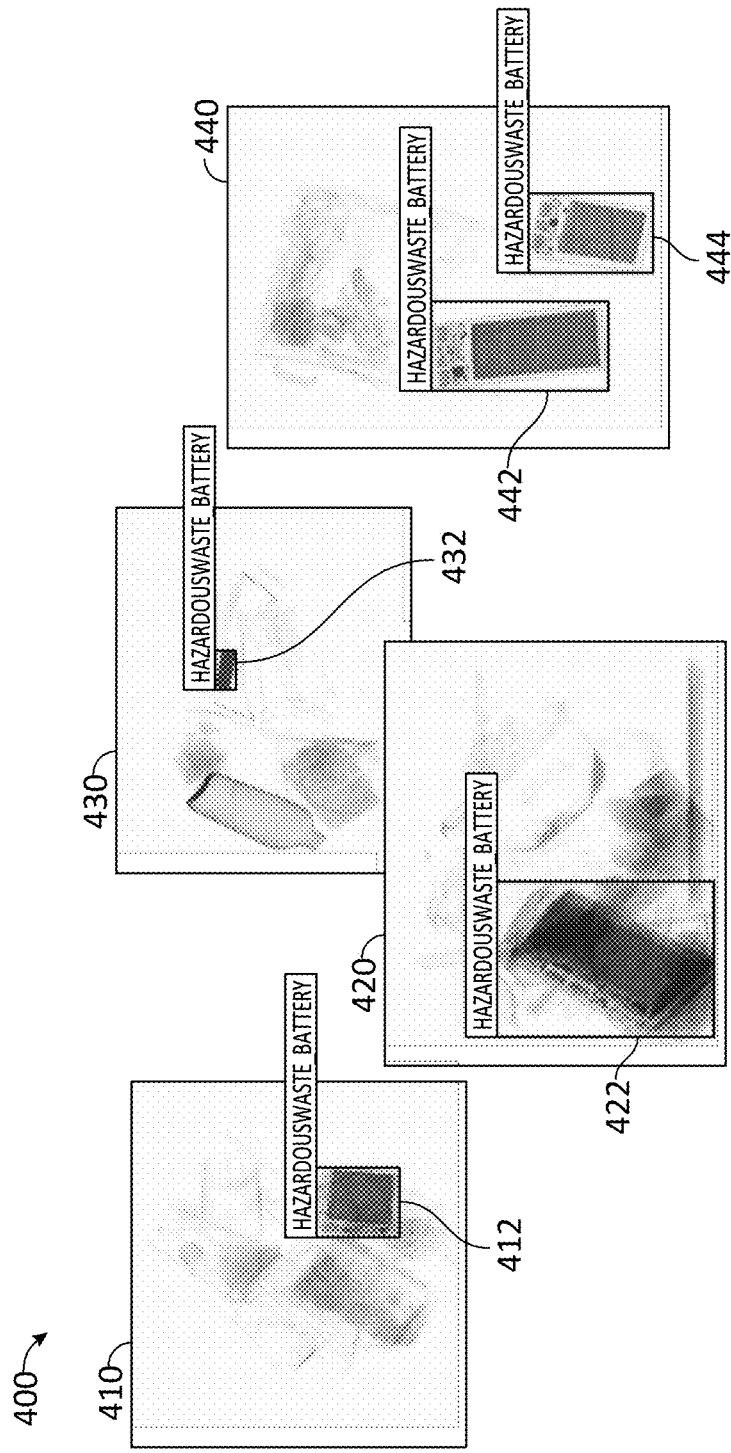
FIG. 4 shows an example depiction of a hazardous item detection system visual interface in accordance with one or more embodiments.
Figure 5:
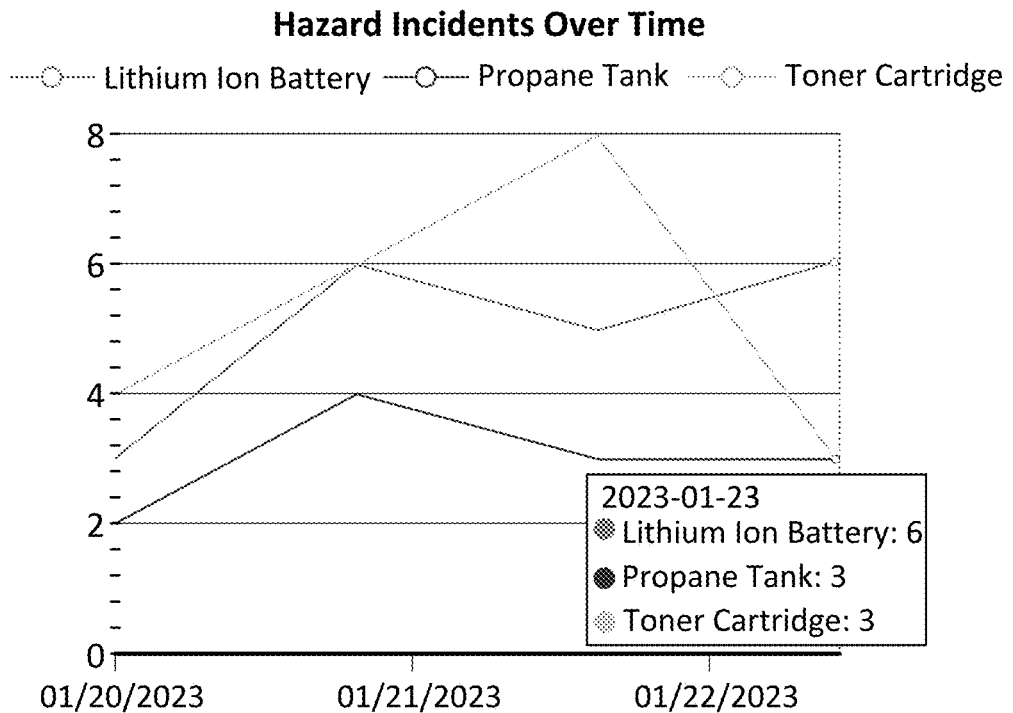
FIGS. 5-6 show example depictions of hazardous item detection system analytics in accordance with one or more embodiments.
Figure 6:
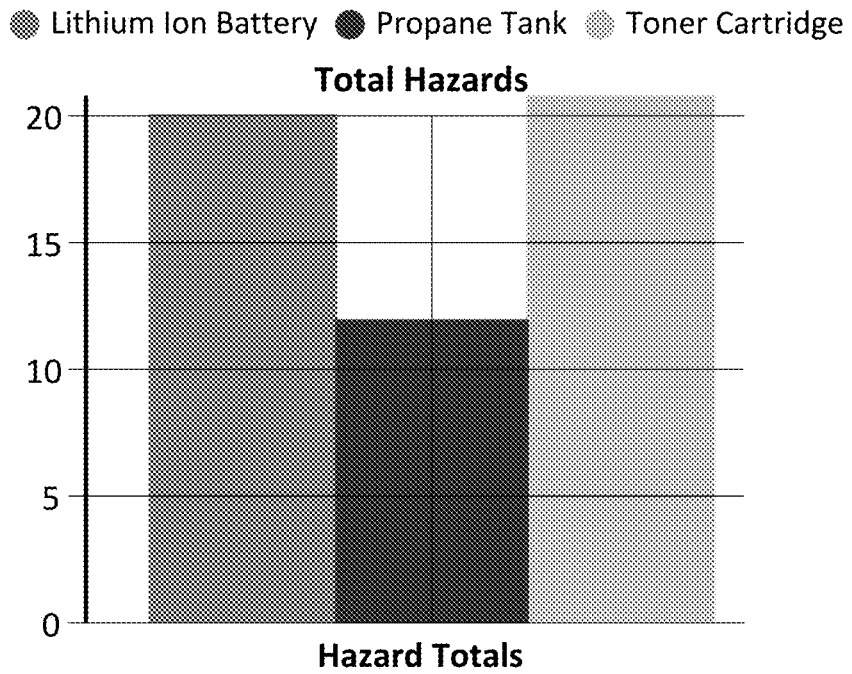

In turn, the AI module 254 may include functionality to identify features of the items captured in the non-visible spectrum image. For example, features may include an infrared profile (e.g., in comparison to proximate items and/or a temperature of the environment), a contour, a shape, a material, an opacity of the items, multiple instances of these features with relation to one another (e.g., two particular shapes situated in a particular way with one another), and so on. For example, an item on the conveyor belt 140 may be an electronic device including a lithium-ion battery (e.g., like the images in FIG. 4). Features of the electronic device and/or the lithium-ion battery may be identified.

In some embodiments, the AI module 254 may include functionality to identify features of the items captured in the visible spectrum image. For example, features may include a color, a contour, a shape, a material, an opacity of the items, multiple instances of these features with relation to one another (e.g., two particular shapes situated in a particular way with one another), and so on. For example, an item on the conveyor belt 140 may be an electronic device including a lithium-ion battery. Features of the electronic device and/or the lithium-ion battery may be identified.

Further, the AI module 254 may include functionality to compare the identified features of the items on the conveyor belt to features of hazardous items of the AI module. For example, the AI module may have previously learned or been trained on hazardous item features, and may utilize these learned/trained features in the comparison. In some embodiments, the AI module 254 may include functionality to use features identified in both the non-visible and visible spectrum images for the comparison.

Moreover, the AI module 254 may include functionality to identify a hazardous item in the non-visible spectrum image based on a similarity between the identified features to the features of hazardous items of the AI module. In some embodiments, the AI module 254 may include functionality to use features identified from both the non-visible and visible spectrum images for the identification.

In addition, the AI module 254 may include functionality to provide, in response to identifying the hazardous item, an indication of the presence of the hazardous item. For example, the control system 250 may cause a notification to be provided to facility workers in the form of a sound, with an alarm, by the conveyor belt stopping, by providing an image of the hazardous item (e.g., a labeled non-visible spectrum image like those in FIG. 4 or visible spectrum image), by pointing out the hazardous item with a light-based beam (e.g., a laser, spotlight, etc.), and so on.

In one or more embodiments, the control system 250 includes functionality to provide location information about the location of the hazardous item on the conveyor belt 140 to a mechanical device (such as a robot) configured to remove the hazardous item from the conveyor belt.

In one or more embodiments, the control system 250 includes functionality to determine that one or more items in the image are unfavorably positioned for imaging (e.g., with the aid of the AI module 254). In response to the determination, the control system 250 may provide an instruction to manipulate the items into more favorable positions for imaging. For example, an instruction may be sent to a facility worker, a mechanical device (e.g., robot), a mechanical screen, or a shaker screen to re-arrange the item(s).

In one or more embodiments, the control system 250 includes functionality to track the location of the hazardous item on the conveyor belt 140 (e.g., based on non-visible spectrum image and/or visible spectrum images), and confirm removal of the hazardous item from the conveyor belt 140 based on a subsequent image (e.g., non-visible spectrum image and/or visible spectrum image) of the hazardous item. For example, the control system 250 includes functionality to cause image capturing device(s) to capture images of the same segment of the conveyor belt 140 either while that segment is at least partially contained by the body 110 or after that segment has exited the body 110.

If, by using the same or similar techniques discussed herein, the control system 250 determines that the hazardous item has not been removed, it may provide an indication of the persistent presence of the hazardous item for removal. In some embodiments, in response to receiving an indication that the item has been removed, the control system 250 may cause the same segment of the conveyor belt 140 to be re-run through the body 110 to be re-imaged by the non-visible and/or visible spectrum image capturing device(s) for confirmation.

In one or more embodiments, the AI module is trained by obtaining multiple training images that together include images of hazardous items and multiple non-hazardous items, applying a hazardous item label to each of the hazardous items and a non-hazardous item label to each of the non-hazardous items, applying the AI module to a training example, comparing an output of the AI module to the label associated with the training example, and updating model parameters of the AI module when the AI module correctly predicts the output through a back-propagation process.

Figure 7:
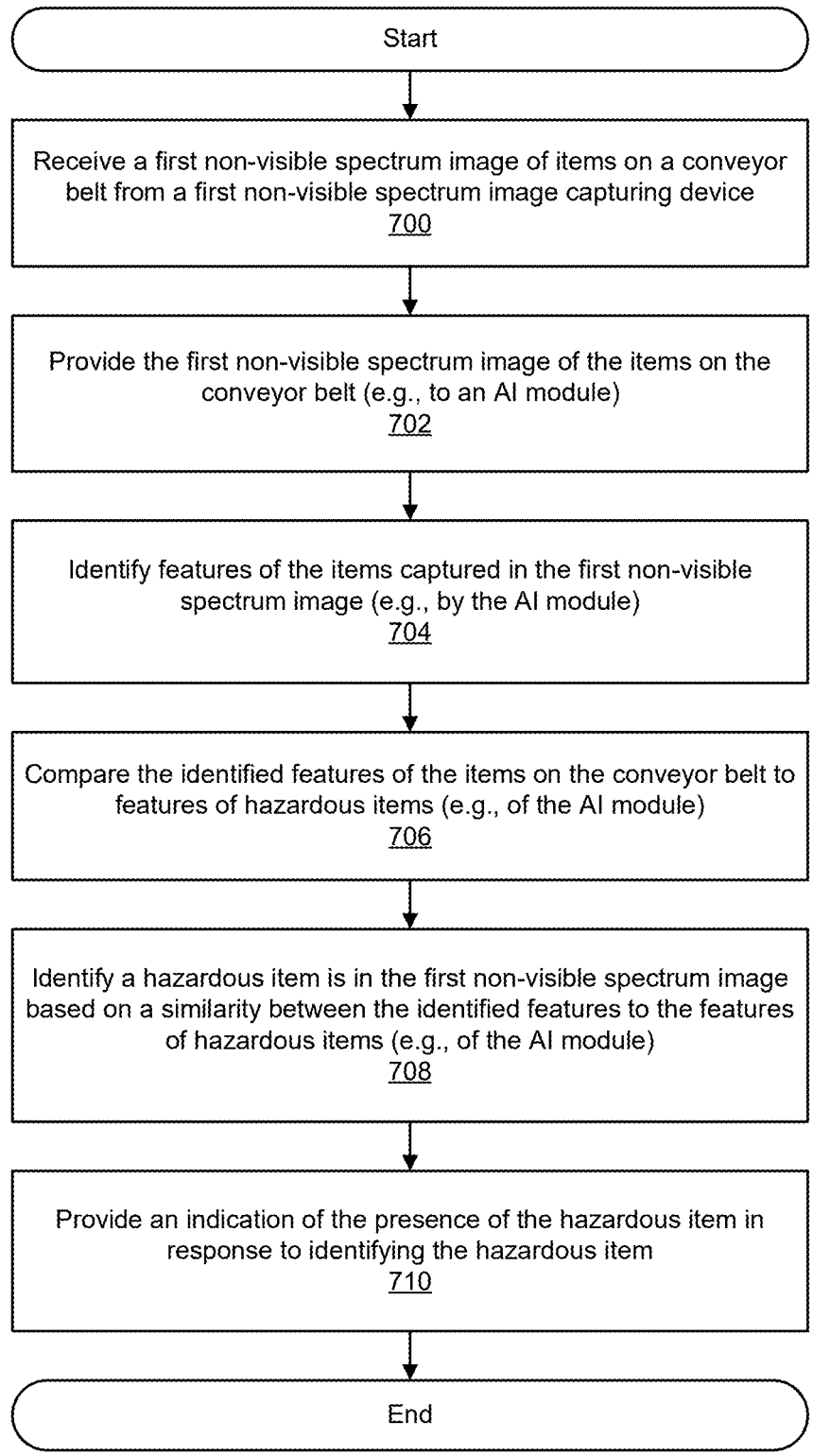
FIG. 7 shows a flowchart in accordance with one or more embodiments.

FIG. 7 shows a flowchart of a method for detecting hazardous items (e.g., in a recycling facility). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 7 should not be construed as limiting the scope of the invention.

In STEP 700, a first non-visible spectrum image of items on a conveyor belt may be received from a first non-visible spectrum image capturing device.

In STEP 702, the first non-visible spectrum image of the items on the conveyor belt is provided to an AI module.

In STEP 704, features of the items captured in the first non-visible spectrum image are identified by the AI module.

In STEP 706, the identified features of the items on the conveyor belt are compared to features of hazardous items of the AI module.

In STEP 708, a hazardous item in the first non-visible spectrum image is identified based on a similarity between the identified features to the features of hazardous items of the AI module.

In STEP 710, an indication of the presence of the hazardous item is provided in response to identifying the hazardous item.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 8:
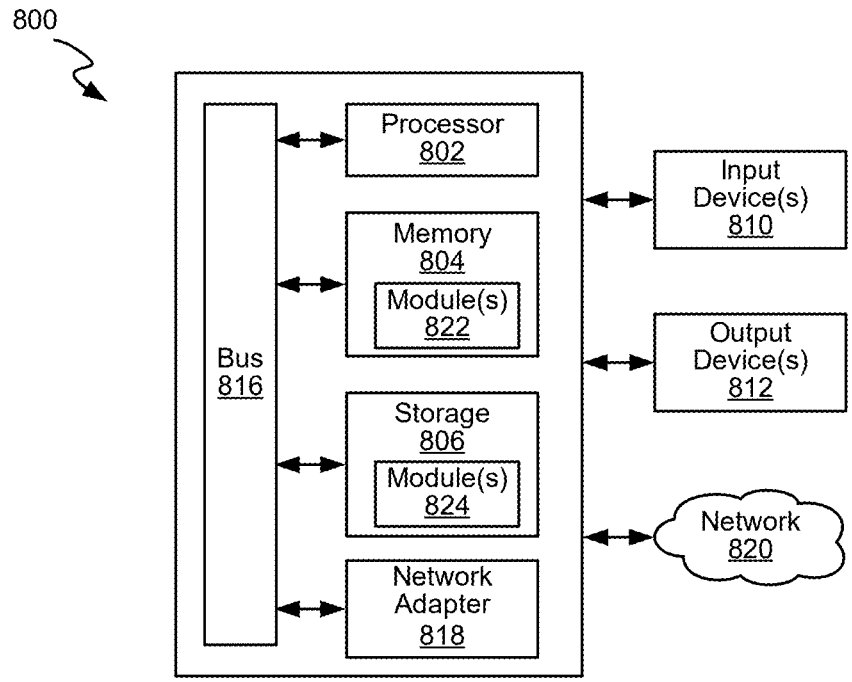
FIGS. 8 and 9 show a computing system and network architecture in accordance with one or more embodiments.

For example, as shown in FIG. 8, the computing system 800 may include one or more computer processor(s) 802, associated memory 804 (e.g., random access memory (RAM), cache memory, flash memory, etc.), one or more storage device(s) 806 (e.g., a hard disk, an optical drive such as a compact disk (CD) drive or digital versatile disk (DVD) drive, a flash memory stick, etc.), a bus 816, and numerous other elements and functionalities. The computer processor(s) 802 may be an integrated circuit for processing instructions. For example, the computer processor(s) may be one or more cores or micro-cores of a processor.

In one or more embodiments, the computer processor(s) 802 may be an integrated circuit for processing instructions. For example, the computer processor(s) 802 may be one or more cores or micro-cores of a processor. The computer processor(s) 802 can implement/execute software modules stored by computing system 800, such as module(s) 822 stored in memory 804 or module(s) 824 stored in storage 806. For example, one or more of the modules described herein can be stored in memory 804 or storage 806, where they can be accessed and processed by the computer processor 802. In one or more embodiments, the computer processor(s) 802 can be a special-purpose processor where software instructions are incorporated into the actual processor design.

The computing system 800 may also include one or more input device(s) 810, such as a touchscreen, keyboard, mouse, microphone, touchpad, electronic pen, or any other type of input device. Further, the computing system 800 may include one or more output device(s) 812, such as a screen (e.g., a liquid crystal display (LCD), a plasma display, touchscreen, or other display device), a printer, external storage, or any other output device. The computing system 800 may be connected to a network 820 (e.g., a local area network (LAN), a wide area network (WAN) such as the Internet, mobile network, or any other type of network) via a network interface connection 818. The input and output device(s) may be locally or remotely connected (e.g., via the network 820) to the computer processor(s) 802, memory 804, and storage device(s) 806.

One or more elements of the aforementioned computing system 800 may be located at a remote location and connected to the other elements over a network 820. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 9:
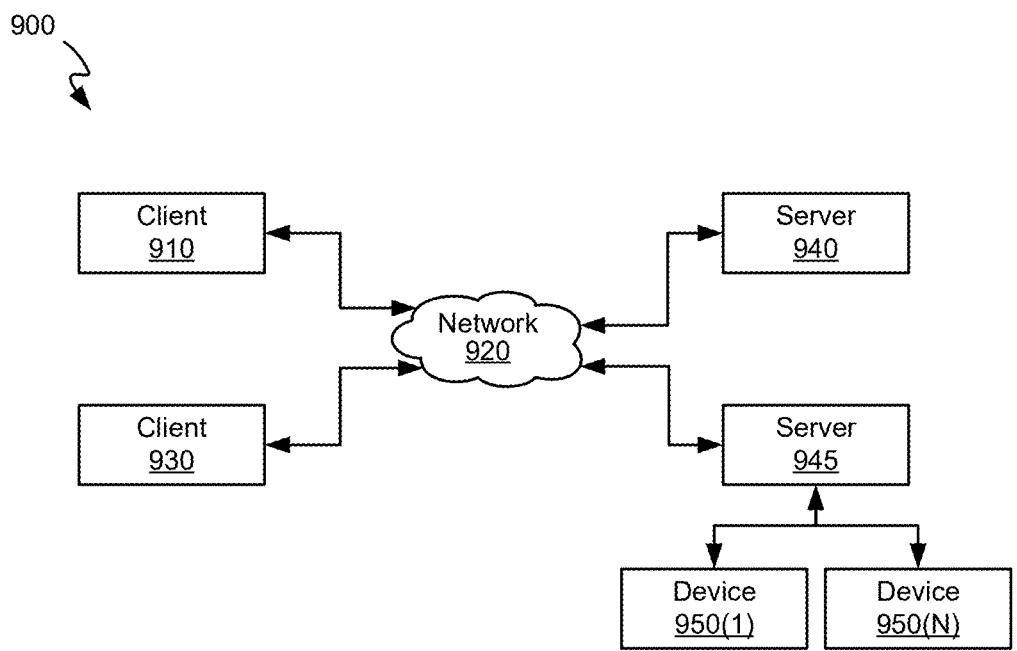

FIG. 9 is a block diagram of an example of a network architecture 900 in which client systems 910 and 930, and servers 940 and 945, may be coupled to a network 920. Network 920 may be the same as or similar to network 820. Client systems 910 and 930 generally represent any type or form of computing device or system, such as client devices (e.g., portable computers, smart phones, tablets, smart TVs, etc.).

Similarly, servers 940 and 945 generally represent computing devices or systems, such as application servers or database servers, configured to provide various database services and/or run certain software applications. Network 920 generally represents any telecommunication or computer network including, for example, an intranet, a wide area network (WAN), a local area network (LAN), a personal area network (PAN), or the Internet.

With reference to computing system 800 of FIG. 8, a communication interface, such as network adapter 818, may be used to provide connectivity between each client system 910 and 930, and network 920. Client systems 910 and 930 may be able to access information on server 940 or 945 using, for example, a Web browser, thin client application, or other client software. Such software may allow client systems 910 and 930 to access data hosted by server 940, server 945, or storage devices 950(1)-(N). Although FIG. 9 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 940, server 945, storage devices 950(1)-(N), or any combination thereof. All or a portion of one or more of the example embodiments disclosed herein may also be encoded as a computer program, stored in server 940, run by server 945, and distributed to client systems 910 and 930 over network 920.

Although components of one or more systems disclosed herein may be depicted as being directly communicatively coupled to one another, this is not necessarily the case. For example, one or more of the components may be communicatively coupled via a distributed computing system, a cloud computing system, or a networked computer system communicating via the Internet.

And although only one computer system may be depicted herein, it should be appreciated that this one computer system may represent many computer systems, arranged in a central or distributed fashion. For example, such computer systems may be organized as a central cloud and/or may be distributed geographically or logically to edges of a system such as a content/data delivery network or other arrangement. It is understood that virtually any number of intermediary networking devices, such as switches, routers, servers, etc., may be used to facilitate communication.

While the invention has been described with respect to a limited number of embodiments, those skilled in the art, having benefit of this disclosure, will appreciate that other embodiments may be devised that do not depart from the scope of the invention as disclosed herein.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

What is claimed is:

1. A method for detecting hazardous items in a recycling facility, comprising:
    receiving, from a first visible spectrum image capturing device, a visible spectrum image of a set of items on a conveyor belt;
    using the visible spectrum image to determine that a first non-visible spectrum image should be captured of the set of items on the conveyor belt;
    initiating capture of the first non-visible spectrum image of the set of items on the conveyor belt by a first non-visible spectrum image capturing device in response to determining that the first non-visible spectrum image should be captured;
    providing, to an AI module, the first non-visible spectrum image of the set of items on the conveyor belt, wherein the AI module includes functionality to:
        identify features of the set of items captured in the first non-visible spectrum image;
        compare the identified features of the set of items on the conveyor belt to features of hazardous items of the AI module; and
        identify a hazardous item in the first non-visible spectrum image based on a similarity between the identified features to the features of hazardous items of the AI module; and
    providing, in response to identifying the hazardous item, an indication of the presence of the hazardous item.

2. The method of claim 1, wherein determining that the first non-visible spectrum image should be captured comprises:
    determining that one or more items of the set of items in the first visible spectrum image are associated with a hazardous item.

3. The method of claim 1, wherein the one or more items in the image that are associated with the hazardous item are electronic devices, and wherein the hazardous item associated with the electronic devices is a lithium-ion battery.

4. The method of claim 1, further comprising:
    receiving, from a second non-visible spectrum image capturing device, a second non-visible spectrum image of the set of items on the conveyor belt, wherein the first non-visible spectrum image capturing device and the second non-visible spectrum image capturing device are positioned with different perspectives from one another; and
    providing, to the AI module along with the first non-visible spectrum image, the second non-visible spectrum image of the set of items on the conveyor belt as additional input for identification of the hazardous item.

5. The method of claim 1, further comprising:
    causing a light-based beam to identify the location of the hazardous item on the conveyor belt.

6. The method of claim 1, further comprising:
    providing location information about the location of the hazardous item on the conveyor belt to a mechanical device configured to remove the hazardous item from the conveyor belt.

7. The method of claim 1, wherein providing the indication of the presence of the hazardous item causes an alert to be provided to a notification system operable to notify a facility worker of the presence of the hazardous item.

8. The method of claim 1, further comprising:
    tracking a location of the hazardous item on the conveyor belt based on a non-visible spectrum image or a visible spectrum image; and
    confirming removal of the hazardous item from the conveyor belt based on a second non-visible spectrum image or a second visible spectrum image of the hazardous item.

9. The method of claim 1, wherein the AI module is trained by:
    obtaining a plurality of training images that together include images of a plurality of hazardous items and a plurality of non-hazardous items;
    applying a hazardous item label to each of the plurality of hazardous items and a non-hazardous item label to each of the plurality of non-hazardous items;
    applying the AI module to a training example;
    comparing an output of the AI module to the label associated with the training example; and
    updating model parameters of the AI module when the AI module correctly predicts the output through a back-propagation process.

10. The method of claim 1, further comprising:
    receiving, from one or more image capturing devices, an image of items on the conveyor belt;

determining that one or more items in the image are unfavorably positioned for imaging; and providing an instruction to manipulate the one or more items into more favorable positions for imaging.

11. A system for detecting hazardous items in a recycling facility, comprising:
   a vision system configured to capture images of items on a conveyor belt, wherein the vision system includes:
      a body operable to be positioned with respect to the conveyor belt, and
      a first visible spectrum image capturing device coupled with the body, wherein the first visible spectrum image capturing device is operable to capture visible spectrum images of items on the conveyor belt; and
      a first non-visible spectrum image capturing device coupled with the body, wherein the first non-visible spectrum image capturing device is operable to capture non-visible spectrum images of items on the conveyor belt; and
   a control unit executing on a computer processor and configured to:
      receive, from the first visible spectrum image capturing device, a visible spectrum image of a set of items on the conveyor belt;
      use the visible spectrum image to determine that a first non-visible spectrum image should be captured of the set of items on the conveyor belt;
      initiate capture of the first non-visible spectrum image of the set of items on the conveyor belt by the first non-visible spectrum image capturing device in response to determining that the first non-visible spectrum image should be captured;
      receive, from the first non-visible spectrum image capturing device, the first non-visible spectrum image of the set of items on the conveyor belt;
      provide, to an AI module, the first non-visible spectrum image of the set of items on the conveyor belt, wherein the AI module includes functionality to:
         identify features of the set of items captured in the first non-visible spectrum image;
         compare the identified features of the set of items on the conveyor belt to features of hazardous items of the AI module; and
         identify a hazardous item in the first non-visible spectrum image based on a similarity between the identified features to the features of hazardous items of the AI module; and
      provide, in response to identifying the hazardous item, an indication of the presence of the hazardous item.

12. The system of claim 11, wherein determining that the first non-visible spectrum image should be captured comprises:
   determining that one or more items of the set of items in the first visible spectrum image are associated with a hazardous item.

13. The system of claim 11, wherein the one or more items in the images that are associated with the hazardous item are electronic devices, and wherein the hazardous item associated with the electronic devices is a lithium-ion battery.

14. The system of claim 11, wherein the control unit is further configured to:
   receive, from a second non-visible spectrum image capturing device, a second non-visible spectrum image of the set of items on the conveyor belt, wherein the first non-visible spectrum image capturing device and the second non-visible spectrum image capturing device are positioned with different perspectives from one another; and
   provide, to the AI module along with the first non-visible spectrum image, the second non-visible spectrum image of the set of items on the conveyor belt as additional input for identification of the hazardous item.

15. The system of claim 11, wherein the control unit is further configured to:
   cause a light-based beam to identify the location of the hazardous item on the conveyor belt.

16. The system of claim 11, wherein the control unit is further configured to:
   provide location information about the location of the hazardous item on the conveyor belt to a mechanical device configured to remove the hazardous item from the conveyor belt.

17. The system of claim 11, wherein providing the indication of the presence of the hazardous item causes an alert to be provided to a notification system operable to notify a facility worker of the presence of the hazardous item.

18. The system of claim 11, wherein the control unit is further configured to:
   tracking a location of the hazardous item on the conveyor belt based on a non-visible spectrum image or a visible spectrum image; and
   confirm removal of the hazardous item from the conveyor belt based on a second non-visible spectrum image or a second visible spectrum image of the hazardous item.

19. The system of claim 11, wherein the AI module is trained by:
   obtaining a plurality of training images that together include images of a plurality of hazardous items and a plurality of non-hazardous items;
   applying a hazardous item label to each of the plurality of hazardous items and a non-hazardous item label to each of the plurality of non-hazardous items;
   applying the AI module to a training example;
   comparing an output of the AI module to the label associated with the training example; and
   updating model parameters of the AI module when the AI module correctly predicts the output through a back-propagation process.

20. The system of claim 11, wherein the control unit is further configured to:
   receive, from one or more image capturing devices, an image of items on the conveyor belt;
   determining that one or more items in the image are unfavorably positioned for imaging; and
   provide an instruction to manipulate the one or more items into more favorable positions for imaging.

* * * * *